United States Patent
Mennecart et al.

(10) Patent No.: US 7,175,084 B2
(45) Date of Patent: Feb. 13, 2007

(54) INTEGRATED CIRCUIT CARD AND CASE THEREFOR

(75) Inventors: José Mennecart, Dry (FR); Eric Delaunay, Sandillon (FR)

(73) Assignee: Axalto SA, Montrouge (FR)

( * ) Notice: Subject to any disclaimer, the term of this patent is extended or adjusted under 35 U.S.C. 154(b) by 183 days.

(21) Appl. No.: 10/149,133

(22) PCT Filed: May 3, 2001

(86) PCT No.: PCT/IB01/00752

§ 371 (c)(1),
(2), (4) Date: Dec. 12, 2002

(87) PCT Pub. No.: WO01/84492

PCT Pub. Date: Nov. 8, 2001

(65) Prior Publication Data

US 2003/0107877 A1    Jun. 12, 2003

(30) Foreign Application Priority Data

May 3, 2000   (FR)   ................................. 00 05648
May 3, 2000   (FR)   ................................. 00 05649

(51) Int. Cl.
*G06K 7/06* (2006.01)

(52) U.S. Cl. ...................... 235/441; 235/380; 235/487; 235/492

(58) Field of Classification Search ................. 235/492, 235/486, 441

See application file for complete search history.

(56) References Cited

U.S. PATENT DOCUMENTS

| | | | | |
|---|---|---|---|---|
| 4,593,736 A * | 6/1986 | Morita | .......................... | 150/147 |
| 5,206,495 A * | 4/1993 | Kreft | ............................ | 235/492 |
| 5,276,317 A * | 1/1994 | Ozouf et al. | ................. | 235/486 |
| 5,929,414 A * | 7/1999 | Saitoh | .......................... | 235/380 |
| 6,045,043 A * | 4/2000 | Bashan et al. | ............... | 235/441 |
| 6,121,544 A * | 9/2000 | Petsinger | .................... | 174/35 R |
| 6,343,744 B1 * | 2/2002 | Shibata et al. | ............... | 235/492 |
| 6,367,701 B1 * | 4/2002 | Fries | ............................. | 235/486 |

FOREIGN PATENT DOCUMENTS

| | | | | |
|---|---|---|---|---|
| JP | 409286190 A | * | 11/1997 | |
| JP | 02000030014 A | * | 1/2000 | |

* cited by examiner

*Primary Examiner*—Seung Ho Lee
(74) *Attorney, Agent, or Firm*—Pehr Jansson

(57) ABSTRACT

An assembly comprises an integrated circuit card capable (2) of communicating data in a contactless fashion. The assembly further comprises a case (32) for the integrated circuit card. The case has an electrical circuit (14, 16) which, when the integrated circuit card is inside the case, is electrically coupled to the integrated circuit card so as to prevent the integrated circuit card from communicating data in a contactless fashion.

6 Claims, 3 Drawing Sheets

INTEGRATED CIRCUIT CARD AND CASE THEREFOR

FIELD OF THE INVENTION

The present invention relates to an assembly comprising an integrated circuit card capable of communication data in a contactless fashion and a case for the integrated circuit card. The integrated circuit cards may be arranged to be, for example, a bank card, a telephone card, an identity card, an access card, etc.

BACKGROUND OF THE INVENTION

The case for the integrated circuit card may be made of a material that constitutes an electromagnetic shield. Accordingly, it is prevented that an unauthorized entity can communicate with the card when the card is in the case. The German patent application published under number 198 17 566 describes such a case.

SUMMARY OF THE INVENTION

An object of the invention is to allow reduction of costs.

To that end, an assembly comprises an integrated circuit card capable of communication data in a contactless fashion and a case for the integrated circuit card, the case having an electrical circuit which, when the integrated circuit card is inside the case, is electrically coupled to the integrated circuit card so as to prevent the integrated circuit card from communicating data in a contactless fashion.

The case in accordance with the invention need not to be made of a material that constitutes an electromagnetic shield so as to prevent unauthorized access to the card. Such a material is relatively expensive. The electric circuit which, in accordance with the invention, is comprised in the case can be of relatively simple structure. The electric circuit may be, for example, a short circuit or a battery. In general, given a conventional case made of, for example, plastic, the additional cost associated with providing the conventional case with a suitable electric circuit, are less than the additional cost of an electromagnetically shielding case compared with the conventional case. Consequently, the invention allows a reduction of cost.

Another advantage of the invention is that the case can be made of transparent material. The integrated circuit card can thus be visible when it is inside the case. This may be particularly advantageous when the card comprises a picture. For example, the card may be an identity badge comprising a photograph.

These and other characteristics and advantages of the invention will appear on reading the following description of a particular and non-limiting embodiment of the invention.

DETAILED DESCRIPTION

Figure 1:
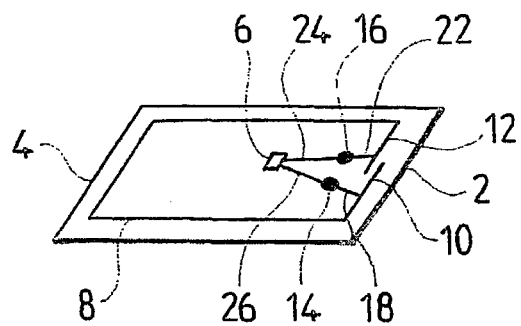
FIG. 1 illustrates a card in accordance with a first embodiment of the invention.
Figure 2:
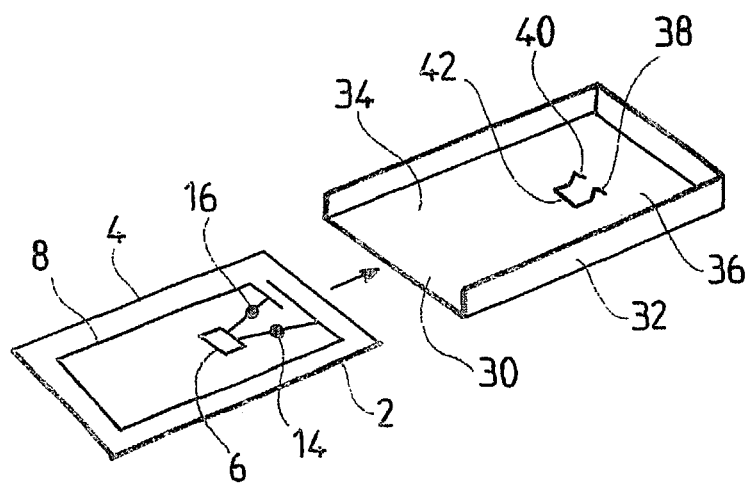
FIG. 2 illustrates a case in accordance with a first embodiment of the invention together with the FIG. 1 card.
Figure 3:
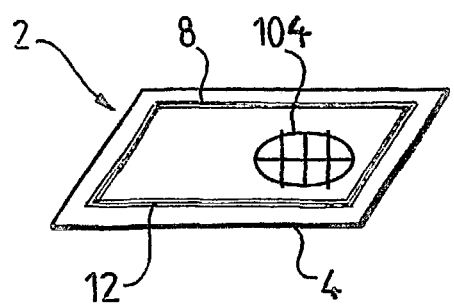
FIG. 3 illustrates a card in accordance with a second embodiment of the invention.
Figure 4:
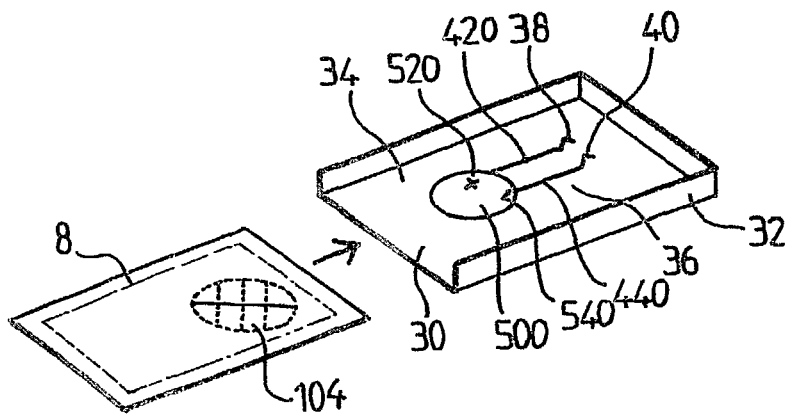
FIG. 4 illustrates a case in accordance with a second embodiment of the invention together with the FIG. 3 card.
Figure 5:
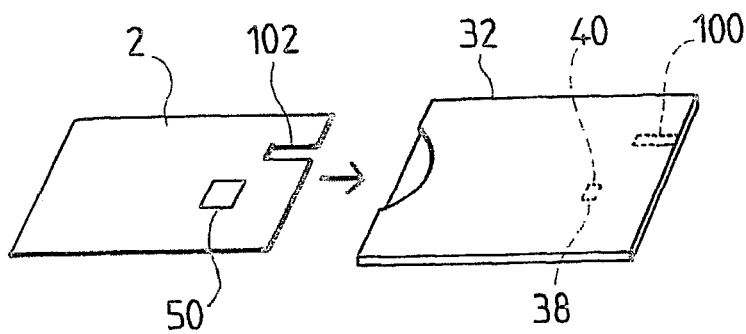
FIG. 5 illustrates an assembly in accordance with invention, which applies to the first and the second embodiment.
Figure 6:
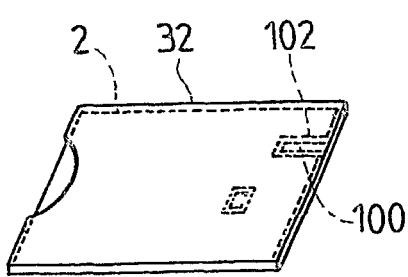
FIG. 6 illustrates the FIG. 5 assembly whereby the card is correctly inserted in the case.
Figure 7:
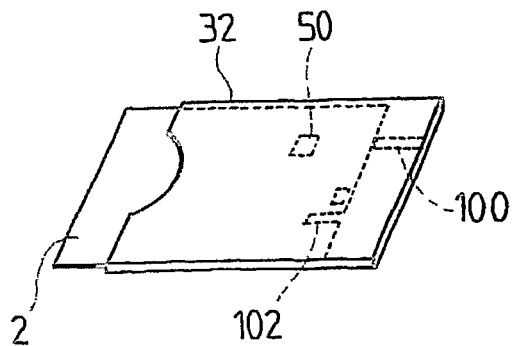
FIG. 7 illustrates the FIG. 5 assembly whereby the card is not correctly inserted in the case.
Figure 8:
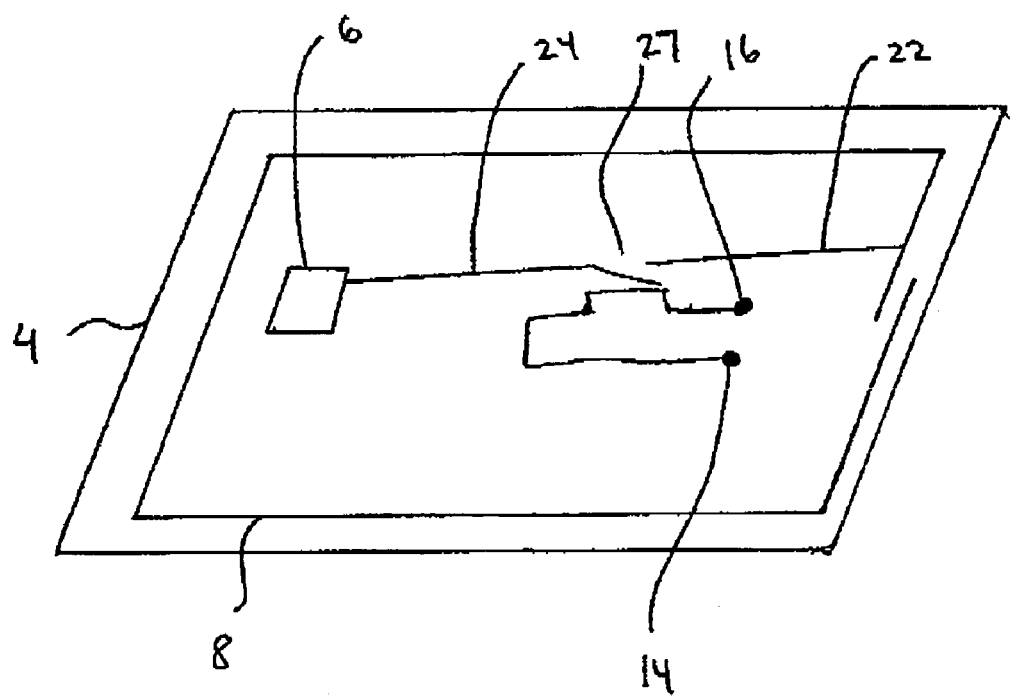
FIG. 8 illustrates a card in accordance with one alternative to a second embodiment of the invention having a switch for decoupling the antenna from the integrated circuit.

A first embodiment of the invention comprises a card that has an antenna and an integrated circuit coupled thereto. The antenna and the integrated circuit are embedded in the card. The antenna is typically formed by a flat coil that has two ends. Each end is coupled to an input of the integrated circuit. Near each end of the flat coil there is a connection between the end concerned and a contact area on a face of the card. Thus, the card comprises two contact areas on one of its faces. These two contact areas allow an external circuit to be coupled in parallel to the antenna embedded in the card. The two contact areas will be referred to as antenna contact areas hereinafter. The card may be of the type having contact areas as defined by the ISO 7816 standard. In that case, the contact areas commonly known as C4 and C8, reserved for future use, may constitute the two antenna contact areas.

The first embodiment further comprises a case for the card described above. The case comprises two contact points on an interior face. The two contact points are complementary with the antenna contact areas of the card. That is, if the card is inserted in the case in a correct fashion, the two contact points come into electrical contact with the antenna contact areas of the card. The case comprises a short circuit coupled between the two contact points. Accordingly, when the card is inside the case, the antenna of the card is short-circuited. This prevents the card from communicating in a contactless fashion.

A second embodiment of the invention comprises a card that has a switch coupled between an antenna and a data-handling circuit. The switch and the data-handling may form part of an integrated circuit that is embedded in the card together with the antenna. The card has contact areas on one of its faces via which contact areas the integrated circuit can communicate data with a reader having complementary contact areas. That is, the card can communicate with a reader by means of electrical contacts and it can also communicate with a reader in a contactless fashion by means of the antenna. Two contact areas on the face of the card are destined to receive a power supply voltage from the reader. These two contact areas will be referred to as power supply contact areas hereinafter. The switch is coupled to the two power supply contact areas. The switch decouples the antenna from the data-handling circuit when a power supply voltage is applied to the power supply contact areas.

The second embodiment further comprises a case for the card described above. The case comprises two contact points on an interior face. The two contact points are complementary with the power supply contact areas of the card. That is, if the card is inserted in the case in a correct fashion, the two contact points come into electrical contact with the power supply contact areas of the card. The case comprises a battery coupled between the two contact points. Accordingly, when the card is inside the case, the switch receives a power supply voltage and, in response, it decoupled the antenna from the data-handling circuit. This prevents the card from communicating in a contactless fashion.

There are numerous alternatives to the embodiments described above. For example, an alternative to the second embodiment is that the switch is controlled via contact areas commonly known as C4 and C8, reserved for future use in accordance with the ISO 7816 standard. That is, the card is arranged such that when a battery voltage is applied to contact areas C4 and C8, the switch decouples decoupled the antenna from the data-handling circuit.

In the Figures likes reference numeral designate like elements. The following reference numerals designate the following elements:

2: a card
4: a card body
6: an integrated circuit
8: an antenna
10: an end of the antenna
12: another end of the antenna
14: a contact area
16: another contact area
18: a coupling between the antenna and the integrated circuit
22: another coupling between the antenna and the integrated circuit
24: an antenna input of the integrated circuit
26: another antenna input of the integrated circuit
27: a switch for decoupling the integrated circuit from the antenna.
30: a slot of a case
32: the case
34: a wall of the case
36: an inner face of the case
38: a contact point
40: another contact point
42: a short circuit
50: a module comprising the integrated circuit 6 and contact areas 14 and 16
100: a strip to prevent the card from being inserted in a wrong manner
102: a notch that is complementary to the strip
104: an assembly of contact areas in accordance with the ISO 7816 standard
420: an electrical connection
440: another electrical connection
500: a battery
520: a positive voltage terminal of the battery
540 a negative voltage terminal of the battery.

With regard to the drawings, the following should be noted. It is possible to provide the case 32 with four sets of contact points, the contact points 38 and 40 constituting one set. This allows the relevant contact areas of the card, for example contact areas 14 and 16, to engage with a set of contact points, no matter how the card is inserted in the case 32. In such an alternative, the strip 102 and the notch 102 can be dispensed with.

The invention claimed is:

1. An assembly comprising:
    an integrated circuit card having an antenna and electrical contact areas according to ISO 7816 standard, two of the electrical contact areas according to ISO 7816 being electrically connected to the antenna, the integrated circuit card being capable of communicating data in a wireless fashion using the antenna and in contacted fashion using the electrical contact areas; and,
    a case for the integrated circuit card, the case having an electrical circuit which, when the integrated circuit card is inside the case, is electrically coupled to a subset of the electrical contact areas of the integrated circuit card, the electrical circuit of the case short-circuiting the two electrical contact areas in such a way that the antenna is short-circuited when the integrated circuit card is in the case.

2. The assembly of claim 1, wherein the two electrical contact areas according to ISO 7816 correspond to C4 and C8.

3. An assembly comprising:
    an integrated circuit card having an antenna, electrical contact areas according to ISO 7816 standard, a data-handling circuit and a switch coupled between the data-handling circuit and the antenna for communicating data in a contactless fashion, the integrated circuit card being capable of communicating data in contacted fashion using the electrical contact areas,
    two of the electrical contact areas according to ISO 7816 being destined to receive a power supply from a reader, and
    the switch decoupling the antenna from the data handling circuit when power supply is applied to the two electrical contact areas; and
    a case for the integrated circuit card, the case having an electrical circuit which, when the integrated circuit card is inside the case, is electrically coupled to the two of the electrical contact areas of the integrated circuit card.

4. The assembly of claim 3 wherein the electrical circuit of the case comprises a battery to be coupled to the said two contact areas when the integrated circuit card is in the case.

5. An assembly comprising:
    an integrated circuit card having an antenna, electrical contact areas according to ISO 7816 standard, a data-handling circuit and a switch coupled between the data-handling circuit and the antenna for communicating data in the contactless fashion, the integrated circuit card being capable of communicating data in contacted fashion using the electrical contact areas,
    the electrical contact areas C4 and C8 of the electrical contact areas according to ISO 7816 being coupled to the switch,
    the switch decoupling the antenna from the data handling circuit in response to an electric signal on electrical contact areas C4 and C8; and
    a case for the integrated circuit card, the case having an electrical circuit which, when the integrated circuit card is inside the case, is electrically coupled to the electrical contact areas C4 and C8 of the integrated circuit card when the integrated circuit card is in the case.

6. The assembly of claim 5, wherein the case comprises a battery for providing a voltage to electrical contact areas C4 and C8 that decouples the antenna from the data handling circuit when the integrated circuit card is in the case.

* * * * *